Patented Aug. 30, 1949

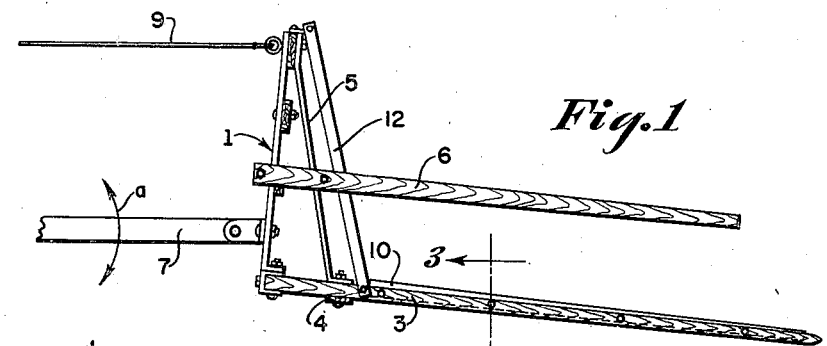
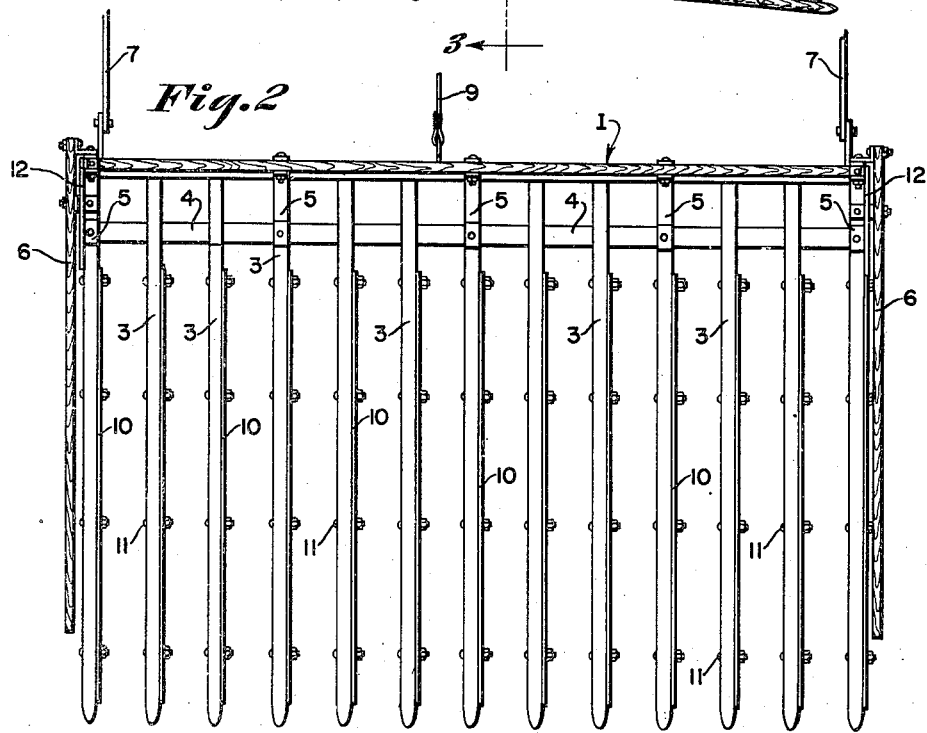
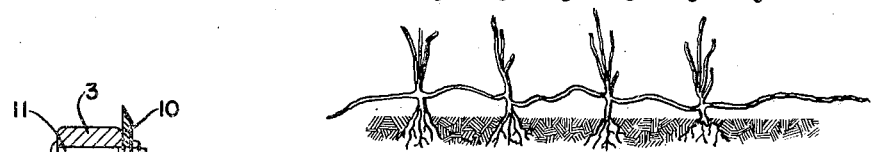

2,480,569

UNITED STATES PATENT OFFICE 2,480,569

GATHERER FOR KUDZU HAY

John L. Gettys, Camden, S. C.

Application July 15, 1946, Serial No. 683,626

3 Claims. (Cl. 56—27)

This invention relates to a hay gatherer particularly adapted for harvesting kudzu hay.

The kudzu vine has a peculiar habit of growth which makes known types of hay gatherers inadaptable to gathering the kudzu crop. As shown in Figure 4, the vine creeps along the ground for a length of twenty or more feet, rooting itself at relatively close intervals wherever a joint touches the ground. It also throws out upright densely foliated branches to a length of several feet. These are cut off close to the vine by a sickle bar set to clear the horizontal stem of the vine and the branches fall upon the vines, constituting the hay crop to be gathered.

The problem is to gather the hay without uprooting the vine. There are several major objections to uprooting the vine. Long lengths of vine clog the gathering apparatus. If the roots are pulled up, they contaminate the hay with earthy matter. If the roots are not pulled up, the vine continues to grow so that replanting is not necessary for a number of years.

One of the objects of the invention is to provide a gathering device similar to an alfalfa sweep, having longitudinal teeth which go beneath the vine and between the roots, the teeth being armed with longitudinal knife edges which sever the vines between the roots, permitting the apparatus to gather the hay to the exclusion of the vine stems and roots.

The bud end of the vine may not yet have become rooted for quite a length, and may yield to the knives without being cut, so that they are loaded on the sweep with the hay. Therefore, another object of the invention is to provide lateral auxiliary knives at the rear of the sweep for severing the bud end as it is pressed against the auxiliary knives by the load, preventing overhanging portions of the bud end from dragging part of the load off the sweep.

Other objects of the invention will appear as the following description of a preferred and practical embodiment thereof proceeds.

In the drawing which accompanies and forms a part of the following specification, and throughout the several figures of which the same reference characters have been employed to denote identical parts:

Figure 1 is a side lvation of a swep embodying the principles of the invention;

Figure 2 is a plan view partly in section;

Figure 3 is a cross-section on an enlarged scale through one tooth and its associated knife blade taken along the line 3—3 of Figure 1;

Figure 4 is a side view showing more or less diametrically the growth habit of the kudzu vine.

Referring now in detail to the drawing, the numeral 1 represents the gathering sweep, the dimensions of which are of course immaterial to the invention, but it is generally quite sizeable, for example, having a width of twelve feet with teeth eight feet long.

The sweep comprises a transverse backboard 2, having a plurality of spaced parallel teeth 3, projecting forwardly from the lower edge of the backboard in a plane perpendicular to that of the backboard. The teeth near their bases are connected by a transverse bar 4 and rigidity in the perpendicular relationship of the teeth and backboard is secured by the provision of braces 5 between the bar 4 and the top of the backboard. Lateral load retaining arms 6 extend forwardly from opposite ends of the backboard substantially parallel to the teeth, but at a higher level.

Such a sweep, insofar as it has been described, is old in the art, being extensively used in gathering alfalfa. The sweep shown is adapted to be carried at the front of a tractor, pivotally connected to push bars 7, extending from the tractor, not shown, and swingable in vertical planes through means, not shown, to lower the sweep to gathering position, or to elevate it above the level of the top of a stack, the double arrow a indicating the swinging movement.

A cable 9, operable from the tractor and attached to the upper part of the sweep, may be slackened to cause the sweep to dump its load.

It is obvious that if this alfalfa sweep, insofar as its structure has been described, were employed for harvesting kudzu hay, the teeth would go between the roots and beneath the bridging portions of the vine stem, ripping the vine up by the roots; imposing unnecessary load upon the tractor; depositing long lengths of vine stem upon the sweep; mingling the dirt-laden roots with the hay; causing the lengths of useless vine stem to tangle in the teeth, braces or side arms, preventing clean dumping of the load; allowing trailing portions of the vine stems to catch on ground obstructions and drag part of the load off the sweep; minimizing the useful load by including the worthless vine stems and roots, and pulling up the roots which are advantageously left in the ground to avoid the necessity and expense of replanting. These and other objections make the ordinary alfalfa sweep altogether impracticable for harvesting kudzu.

The main feature of the present invention is the provision of longitudinal knives 10, fixed to the teeth as by bolts 11, each having a keen upper edge. The knives are preferably so positioned that the anterior end starts below the level of the upper face of the tooth. From this point the knife edge inclines progressively upwardly in a rearward direction. Thus, the height of the knife edges from the plane of the upper faces of the teeth is greater toward the rear of the teeth than near their free ends, so that when the teeth of the sweep pass beneath the bridging sections of the vine stem between the roots, the bridging sections will be tensioned against the knife edges at different points along the length of said knife edges according to the slackness of said bridging portions, and severed. In this manner the roots are left in the ground, the severed vine stems are not collected on the sweep, but left on the ground attached to the roots, the cut hay being selectively gathered free from objectionable vine debris.

A secondary feature of the invention is the provision of the lateral knives 12 which are upwardly and rearwardly inclined in a vertical plane, one at each side of the sweep with their edges directed forwardly. Fairly long lengths of vine adjacent the bud end may not have rooted, and these will not be tensioned upon the knives 10 and will not be severed by said knives but will be gathered upon the sweep and may cause trouble by hanging over the lateral edges of the sweep, catching in obstructions and pulling off part of the load. When such portions of the vine reach the knives 12, they are pushed against the knives by the load, and the overhanging portions severed. These terminal unrooted portions of the vine are tender, and such part as remains on the sweep makes acceptable hay.

While I have in the above disclosure described what I believe to be a preferred and practical embodiment of the invention, it will be understood that the nature of the sweep is not material to the inventive concept and that variations in the construction and arrangement of the parts may be made without departing from the principles or scope of the invention.

What I claim as my invention is:

1. Gatherer for kudzu hay comprising a sweep having spaced parallel teeth lying in a common plane, a knife for each tooth secured to a side thereof, said knives having upwardly directed cutting edges extending longitudinally of said teeth throughout a major part of the length thereof, intersecting the common plane of said teeth near their free ends and sloping upwardly from said common plane in a direction away from their free ends.

2. Gatherer for kudzu hay comprising a sweep having a backboard, parallel spaced teeth extending forwardly from the lower part of said backboard, lying in a common plane, a knife secured to each tooth, said knives having upwardly directed cutting edges extending longitudinally of said teeth throughout a major portion of the length thereof, intersecting the plane of said teeth near their free ends, sloping upwardly from said common plane in a direction away from said free ends, and a knife at each side of said sweep extending from the upper part of said backboard to the common plane of said teeth, having a forwardly directed knife edge.

3. Gatherer for kudzu hay comprising a sweep having spaced parallel teeth lying in a common plane, a knife for each tooth, said knives having upwardly directed cutting edges extending longitudinally of said teeth throughout a major part of the length thereof, intersecting the common plane of said teeth near their free ends and sloping upwardly from said common plane in a direction away from their free ends.

JOHN L. GETTYS.

REFERENCES CITED

The following references are of record in the file of this patent:

UNITED STATES PATENTS

| Number | Name | Date |
| --- | --- | --- |
| 1,362,425 | Kouns | Dec. 14, 1920 |
| 1,383,184 | Borland | June 28, 1921 |
| 1,407,962 | Thomas | Feb. 28, 1922 |
| 1,518,774 | Conrad | Dec. 9, 1924 |
| 1,703,402 | Matsuoka | Feb. 26, 1929 |
| 2,011,005 | Mack | Aug. 13, 1935 |
| 2,065,830 | Sherman | Dec. 29, 1936 |